United States Patent [19]

Schläfer et al.

[11] Patent Number: 5,292,871

[45] Date of Patent: Mar. 8, 1994

[54] WATER-SOLUBLE COMPOUNDS HAVING A FIBER-REACTIVE GROUP OF THE VINYL SULFONE MONOAZO SERIES BONDED TO AN ALKANOYLAMINO OF BENZOYLAMINO GROUPING, SUITABLE AS DYESTUFFS

[75] Inventors: Ludwig Schläfer, Kelkheim; Werner H. Russ, Flörsheim am Main, both of Fed. Rep. of Germany

[73] Assignee: Hoechst Aktiengesellschaft, Frankfurt, Fed. Rep. of Germany

[21] Appl. No.: 965,072

[22] Filed: Oct. 22, 1992

[30] Foreign Application Priority Data

Oct. 24, 1991 [DE] Fed. Rep. of Germany ....... 4135067

[51] Int. Cl.$^5$ .................. C09B 62/51; D06P 1/384
[52] U.S. Cl. .................. 534/642; 534/591; 534/641
[58] Field of Search ................. 534/641, 642

[56] References Cited

U.S. PATENT DOCUMENTS

| | | | |
|---|---|---|---|
| 3,426,008 | 2/1969 | Meininger et al. | 534/641 X |
| 3,440,240 | 4/1969 | Kuhne et al. | 534/641 X |
| 3,518,245 | 6/1970 | Meininger et al. | 534/629 |
| 3,637,648 | 1/1972 | Kuhne et al. | 534/641 |
| 3,655,642 | 4/1972 | Meininger et al. | 534/642 |
| 4,473,498 | 9/1984 | Schlafer et al. | 534/641 |
| 5,055,565 | 10/1991 | Springer et al. | 534/642 |

FOREIGN PATENT DOCUMENTS 0036383 9/1981 European Pat. Off. .

*Primary Examiner*—Robert W. Ramsuer
*Assistant Examiner*—Fiona T. Powers
*Attorney, Agent, or Firm*—Connolly & Hutz

[57] ABSTRACT

Water-soluble monoazo compounds conforming to the general formula (1)

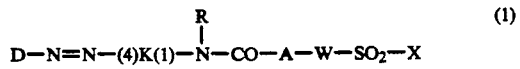

where D is monosulfo- or disulfo-phenyl, which may each be substituted by lower alkyl, lower alkoxy, halogen, carboxy and/or lower alkanoylamino, or is mono- or di- or trisulfonaphthyl, K as the radical of a coupling component is para-phenylene, which may be substituted by lower alkyl, lower alkoxy, halogen, lower alkanoylamino, ureido, carbamoyl and/or sulfo, or is 1,4-naphthylene, which may be substituted by 1 or 2 sulfo groups and/or a lower alkoxy group, R is hydrogen or lower alkyl, A is phenylene or a direct bond, W is a direct bond or lower alkylene or an amino group substituted by lower alkyl, although A and W are not both a direct bond, and the group —SO$_2$—X is a fiber-reactive group of the vinyl sulfone series.

The azo compounds of the formula (1) are fiber-reactive and have very good dyestuff properties. They dye hydroxy- and/or carboxamido-containing material, in particular fiber material, for example cellulose fiber materials, wool and synthetic polyamide fibers, in strong, bright, fast shades. In particular they are suitable for discharge and resist printing.

7 Claims, No Drawings

WATER-SOLUBLE COMPOUNDS HAVING A FIBER-REACTIVE GROUP OF THE VINYL SULFONE MONOAZO SERIES BONDED TO AN ALKANOYLAMINO OF BENZOYLAMINO GROUPING, SUITABLE AS DYESTUFFS

DESCRIPTION

The present invention relates to the field of fiber-reactive azo dyes.

The present invention provides novel, useful fiber-reactive monoazo compounds which give dyeings having good to very good wet fastness properties and which are very highly suitable for discharge and resist printing and thus are widely usable for dyeing fiber materials. In discharge printing, a previously dyed cloth (the ground) is printed in a desired pattern with a discharging agent; the discharging agent destroys the dye, provided it is dischargeable, so that at the end of the discharge process a white pattern appears on the ground (white discharge). If the discharge paste additionally contains a discharge-stable dye, then at the end of the discharge process, and after the customary treatment for fixing this added dye, the ground will bear a printed pattern in a different color (colored discharge). - In resist printing, the fabric is first printed with a suitable resist agent in a desired pattern. The printed fabric is then overpadded or overprinted with a dye capable of binding with the resist agent and thus no longer capable of becoming fixed on the fabric, so that no dye fixation will occur in the resist-printed areas and the dyeing obtained will thus bear a white pattern corresponding to the pattern printed with the resist agent.

The novel monoazo compounds of the invention have the general formula (1)

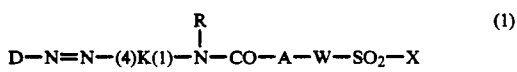

$$D-N=N-(4)K(1)-\overset{R}{N}-CO-A-W-SO_2-X \quad (1)$$

where:
- D is monosulfophenyl or disulfophenyl, which may each be substituted by 1 or 2 substituents selected from the group consisting of alkyl of 1 to 4 carbon atoms, such as ethyl or in particular methyl, alkoxy of 1 to 4 carbon atoms, such as ethoxy or in particular methoxy, halogen, such as bromine or in particular chlorine, carboxy and alkanoylamino of 2 to 5 carbon atoms, such as propionylamino or in particular acetylamino, or is mono-, di- or trisulfonaphthyl;
- K, the radical of a coupling component, is para-phenylene, which is unsubstituted or substituted by 1 or 2 substituents selected from the group consisting of alkyl of 1 to 4 carbon atoms, such as ethyl or in particular methyl, alkoxy of 1 to 4 carbon atoms, such as ethoxy or in particular methoxy, halogen, such as chlorine, alkanoylamino of 2 to 5 carbon atoms, such as propionylamino or acetylamino, ureido, carbamoyl and sulfo, or is 1,4-naphthylene, which may be substituted by 1 or 2 sulfo groups and/or 1 alkoxy group of 1 to 4 carbon atoms, such as ethoxy or in particular methoxy;
- R is hydrogen or alkyl of 1 to 4 carbon atoms, such as ethyl or in particular methyl, preferably hydrogen;
- A is phenylene, such as para-phenylene or in particular meta-phenylene, or a direct bond;
- W is a direct bond or alkylene of 1 to 4 carbon atoms, such as ethylene or methylene, or an amino group of the formula —N(R$^1$)—, where R$^1$ is alkyl of 1 to 4 carbon atoms, preferably methyl, but A and W are not both a direct bond;
- X is vinyl or is ethyl substituted in the β-position by a substituent eliminable by alkali to form a vinyl group.

Examples of alkali-eliminable substituents in the β-position of the ethyl group of X are alkanoyloxy of 2 to 5 carbon atoms, such as acetyloxy, benzoyloxy, sulfobenzoyloxy, toluenesulfonyloxy, halogen, such as bromine or in particular chlorine, dimethylamino, diethylamino, phosphato, thiosulfato and sulfato.

The groups "sulfo", "carboxy", "phosphato", "thiosulfato" and "sulfato" include not only the acid form thereof but also the salt form thereof. Accordingly, sulfo groups are groups conforming to the general formula —SO$_3$M, carboxy groups are groups conforming to the general formula —COOM, phosphato groups are groups conforming to the general formula —OPO$_3$M$_2$, thiosulfato groups are groups conforming to the general formula —S—SO$_3$M and sulfato groups are groups conforming to the general formula —OSO$_3$M, wherein M is in each case as defined above.

A monosulfophenyl D is preferably substituted by 1 or 2, preferably 1, substituents selected from the group consisting of alkyl and alkoxy each of 1 to 4 carbon atoms. In addition to such substituted or unsubstituted monosulfophenyl, preference is given to disulfophenyl and di- and trisulfonaphthyl, the naphthyl preferably being 2-naphthyl.

K is preferably 1,4-phenylene, which may be substituted by 1 substituent, for ex. by methyl, ethyl, methoxy, ethoxy, acetylamino, propionylamino, ureido or sulfo, or is naphthylene, which may be substituted by sulfo, methoxy, ethoxy, methyl or ethyl. K is particularly preferably 3-ureido-1,4-phenylene or 8-sulfo-1,4-naphthylene.

Of the compounds of the general formula (1) according to the invention, preference is further given to those in which X is vinyl, β-chloroethyl or β-sulfatoethyl, in particular vinyl or β-chloroethyl.

Examples of D in the compounds of the general formula (1) are 2,4-disulfophenyl, 2,5-disulfo-4-methoxyphenyl, 4-sulfo-2-methoxyphenyl, 4-sulfo-2,5-dimethoxyphenyl, 2,4-disulfonaphth-1-yl, 2,5-disulfonaphth-1-yl, 2,5,7-trisulfonaphth-1-yl, 2,4,7-trisulfonaphth-1-yl, 3,5,7-trisulfonaphth-1-yl, 3,6,8-trisulfonaphth-1-yl, 3,6-disulfo-naphth-1-yl, 4,7-disulfonaphth-1-yl, 4,6-disulfonaphth-1-yl, 4,8-disulfonaphth-2-yl, 4,6,8-trisulfonaphth-2-yl and 3,6,8-trisulfonaphth-2-yl.

Examples of radicals of the general formula —(4)K(-1)—N(R)— in the compounds of the general formula (1) are 3-methyl-1,4-phen-1,4-ylen-1-amino, phen-1,4-ylen-1-(N-methyl)amino, phen-1,4-ylen-1-amino, 2,5-dimethylphen-1,4-ylen-1-amino, 2-methoxy-5-methylphen-1,4-ylen-1-amino, 3-acetylaminophen-1,4-ylen-1-amino, 3-ureidophen-1,4-ylen-1-amino, naphth-1,4-ylen-1-amino, 6-sulfonaphth-1,4-ylen-1-amino,7-sulfonaphth-1,4-ylen-1-amino and 8-sulfonaphth-1,4-ylen-1-amino.

Examples of radicals conforming to the general formula —A—W—SO$_2$—X in the compounds of the general formula (1) are 3-(β-chloroethylsulfonyl)phenyl, 3-(vinylsulfonyl)phenyl, 4-(β-chloroethylsulfonylmethyl)phenyl, β-(β'-chloroethylsulfonyl)ethyl, γ-(β'-chloroethylsulfonyl)propyl and 4-[N-methyl-N-(β-chloroethylsulfonyl)]aminophenyl.

The present invention further provides processes for preparing the azo compounds of the general formula (1), which comprise reacting an aminoazo compound of the general formula (2)

where D, K and R are each as defined above, with a compound of the general formula (3)

where Hal is bromine or preferably chlorine and A, W and X are each as defined above, at a temperature between 0° and 40° C., preferably between 15° and 30° C., and at a pH between 1 and 9, preferably between 6 and 8.

All the starting compounds, i.e. the diazo components of the general formula $D-NH_2$, the coupling components of the formula $H-K-N(R)-H$ and the acid chlorides of the general formula (3), are known in the literature.

Examples of starting compounds of the general formula $D-NH_2$ which can be used as diazo components for synthesizing the starting azo compounds of the general formula (2) are 2,4-disulfoaniline, 2,5-disulfoaniline, 2,5-disulfo-4-methylaniline, 2,5-disulfo-4-methoxyaniline, 4-sulfo-2-methoxyaniline, 4-sulfo-2,5-dimethoxyaniline, 2,4-disulfo-1-aminonaphthalene, 2,5-disulfo-1-aminonaphthalene, 2,5,7-trisulfo-1-aminonaphthalene, 2,4,7-trisulfo-1-aminonaphthalene, 3,5,7-trisulfo-1-aminonaphthalene, 3,6,8-trisulfo-1-aminonaphthalene, 3,6-disulfo-1-aminonaphthalene, 4,7-disulfo-1-aminonaphthalene,4,6-disulfo-1-aminonaphthalene, 4,8-disulfo-2-aminonaphthalene, 4,6,8-trisulfo-2-aminonaphthalene and 3,6,8-trisulfo-2-aminonaphthalene.

Examples of coupling components are aniline, N-methylaniline, 3-methylaniline, 2,5-dimethylaniline, 2-methoxy-5-methylaniline, 3-acetylaminoaniline, 3-ureidoaniline, 1-aminonaphthalene, 6-sulfo-1-aminonaphthalene, 7-sulfo-1-aminonaphthalene, 8-sulfo-1-aminonaphthalene and 2-methoxy-6-sulfo-1-aminonaphthalene.

Examples of starting compounds of the general formula (3) are 3-(β-chloroethylsulfonyl)benzoyl chloride, 4-(β-chloroethylsulfonylmethyl)benzoyl chloride, 2-(β-chloroethylsulfonyl)propionyl chloride, 3-(β-chloroethylsulfonyl)butanoyl chloride and 4-[N-methyl-N-(β-chloroethylsulfonyl)]aminobenzoyl chloride.

The reaction of the compounds of the general formulae (2) and (3) is carried out in an aqueous organic or preferably aqueous medium. If the reaction is carried out in an aqueous organic medium, the organic medium is a solvent which is inert toward the reactants and preferably miscible with water; examples of solvents of this type are toluene and in particular acetone, N-methylpyrrolidone and dimethyl sulfoxide.

The separation of the compounds prepared according to the invention from the synthesis batches is effected by generally known methods, for example by precipitation from the reaction medium by means of an electrolyte, for example sodium chloride or potassium chloride, or by evaporating or spray drying the reaction solution, in which case a buffer substance may be added to the reaction solution. The novel azo compounds of the general formula (1) according to the invention—hereinafter compounds (1)—have fiber-reactive properties and very good dyestuff properties. They can therefore be used for dyeing hydroxy- and/or carboxamido-containing material, in particular fiber material, but also leather. Similarly, the as-synthesized solutions of the compounds (1) can be used for dyeing, namely directly as a liquid brand with or without prior addition of customary buffer substance capable of maintaining a pH between 3 and 7 and with or without prior concentrating of the solution.

The present invention therefore also provides the use of the novel compounds (1) for dyeing (including printing) hydroxy- and/or carboxamido-containing materials in particular fiber materials, or, to be more precise, processes for the application thereof to these substrates. Methods analogous to known methods can be employed.

Hydroxy containing materials are those of natural or synthetic origin, for example cellulose fibers or regenerated products thereof and polyvinyl alcohols or cellulose-containing products, such as paper.

Cellulose fiber materials are preferably cotton but other vegetable fibers as well, such as linen, hemp, jute and ramie fibers; examples of regenerated cellulose fibers are staple viscose and filament viscose.

Examples of carboxamido-containing materials are synthetic and natural polyamides and polyurethanes not only in bulk form, e.g. sheet/film, but also in the form of fibers, for example wool and other animal hairs, silk, leather, nylon-6,6, nylon-6, nylon-11 and nylon-4.

The compounds (1), as provided for by the use according to the invention, can be applied to and fixed on the substrates mentioned by the application techniques known for water-soluble dyes, in particular for fiber-reactive dyes, for example by applying or introducing the compound (1) in dissolved form to or into the substrate and fixing it thereon or therein by the action of heat or by the action of an alkaline agent or both. Such dyeing and fixing techniques have been numerously described not only in the trade literature but also in the patent literature, for example in European Patent Application Publication No. 0 218 131.

The novel compounds (1) are readily or very readily soluble in water and highly stable in print pastes and dyebaths. They are notable for a high color strength and a good color buildup and produce with very high degrees of fixation strong yellow dyeings and prints possessing good end-use and manufacturing fastness properties, for example fastness to washing, seawater, water, chlorinated water, acid, alkali, cross-dye, perspiration, gas fume fading, dry heat setting and pleating, decatizing, dry cleaning and rubbing. The light fastness properties of the resulting dyeings and prints are very good not only in the dry state but also when moistened with tap water or with an acid or alkaline perspiration solution. Unfixed dye portions are readily washed off. Prints on cellulose fiber materials have a crisp outline and a clear white ground. Prints and dyeings do not bleed or mark off in the unfixed state.

However, the novel compounds (1) are particularly suitable for discharge and resist printing. Their usefulness in these two industrially important application techniques is due to the fact that dyeings of these novel compounds (1) are dischargeable to a pure white and that the novel compounds (1) do not, as desired, stain cellulose fiber material where it has been printed or impregnated with a resist agent, even under the customary fixing conditions for fiber-reactive dyes, i.e. in the presence of alkaline agents and at elevated temperatures, so that the novel compounds (1) are conveniently suitable for preparing dyeings where a negative pattern has been applied with a resist agent.

The Examples which follow serve to illustrate the invention. Parts and percentages are by weight, unless otherwise stated. Parts by weight bear the same relation to parts by volume as the kilogram to the liter.

The compounds described in these Examples by means of a formula are indicated in the form of the free acids; in general, they are prepared and isolated in the form of their alkali metal salts, such as lithium, sodium or potassium salts, and used for dyeing in the form of their salts.

Similarly, the starting compounds and the components mentioned in the form of the free acid in the subsequent Examples, in particular Table Examples, can be used in the synthesis as such or in the form of their salts, preferably alkali metal salts.

The absorption maxima ($\lambda_{max}$ values) indicated for the visible region for the compounds according to the invention were determined on aqueous solutions of their alkali metal salts. In the Table Examples the $\lambda_{max}$ values are given in brackets in the hue column; the reported wavelength is in nm.

EXAMPLE 1

A solution of 25.3 parts of aniline-2,5-disulfonic acid in a mixture of 15.4 parts of concentrated sulfuric acid and 500 parts of water is diazotized at 5° to 10° C. with 17.3 parts of a 40% aqueous sodium nitrite solution. Excess nitrous acid is destroyed as usual with amidosulfuric acid. Then 21.8 parts of 1-aminonaphthalene-8-sulfonic acid are added and the coupling reaction is carried out without further cooling at pH 2 to 3. The resulting aminoazo compound is admixed over about 2 to 3 hours with 37.4 parts of 3-($\beta$-chloroethylsulfonyl)benzoyl chloride by thorough stirring while a temperature of 15° to 30° C. and a pH of 6.5 to 7.5 are maintained. Thereafter the resulting solution containing the azo compound of the invention is clarified and the azo compound is isolated from the filtrate in a conventional manner by salting out with sodium chloride or potassium chloride, or by evaporating under reduced pressure, or by spray drying.

The product obtained is a readily water-soluble, electrolyte(sodium chloride or potassium chloride)-containing powder of the alkali metal (sodium or potassium) salt of the compound of the formula

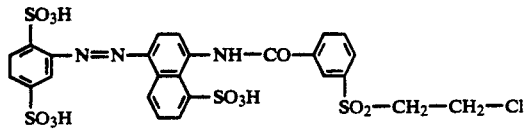

($\lambda_{max}$ = 370 nm)

which has very fiber-reactive dyestuff properties. Applied and fixed by the application and fixing methods customary for fiber-reactive dyes, the azo compound of the invention produces on the fiber materials mentioned in the description, in particular on cellulose fiber materials, strong, bright, neutral yellow dyeings and prints having good fastness properties, of which in particular the light, wash, chlorine, perspiration, wet light and perspiration light fastness properties can be singled out. The azo compound of the invention has good buildup properties. The prints obtainable therewith have a clear white ground, and unfixed portions of the compound are readily washed off. Resist-impregnated parts of fabric are not stained by the azo compound of the invention, so that it is very highly suitable for preparing bright, crisp patterns in resist printing. Moreover, dyeings with the dye are dischargeable to white with the discharging agents customary in the industry.

EXAMPLE 2

A mixture of a neutral solution of 38.3 parts of 2-aminonaphthalene-4,6,8-trisulfonic acid in 500 parts of water and 17.4 parts of a 40% aqueous sodium nitrite solution are slowly stirred into a mixture of 15.5 parts of concentrated sulfuric acid and 200 parts of ice. After further stirring for one hour, excess nitrous acid is removed, and 14.5 parts of 3-aminophenylurea are added to the diazonium salt solution obtained. The coupling reaction is carried out at pH 2 and at a temperature of 15° to 20° C. Thereafter the batch is brought to pH 6 to 7 and admixed over about two hours with a solution of 33.7 parts of 4-($\beta$-chloroethylsulfonylmethyl)benzoyl chloride in 100 parts by volume of toluene. After the acylation reaction has ended, the pH of the batch is adjusted to 4, the batch is heated to the boil, and the toluene is distilled off. The solution is clarified and the resulting azo compound of the invention is isolated by evaporating the filtrate.

The compound of the invention, which written in the form of the free acid, has the formula

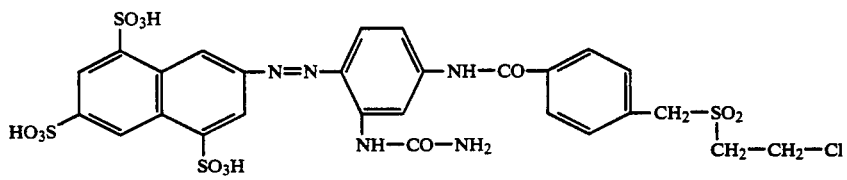

($\lambda_{max}$ = 401 nm)

is obtained as the alkali metal (sodium) salt in the form of a reddish brown electrolyte(predominantly sodium chloride)-containing powder.

Applied by the application techniques customary in the industry for fiber-reactive dyes, the azo compound of the invention produces strong reddish yellow dyeings and prints having good fastness properties, of which in particular the light, wash, chlorine, perspiration, wet light and perspiration light fastness properties can be singled out. The azo compound of the invention has good buildup properties. The prints obtainable therewith have a clear white ground, and unfixed portions of the compound are readily washed off. Resist-impregnated parts of fabric are not stained by the azo compound of the invention, so that it is very highly suitable for preparing bright, crisp patterns in resist printing. Moreover, dyeings with the dye are dischargeable to white with the discharging agents customary in the industry.

EXAMPLE 3

20.3 parts of 2-aminonaphthalene-4,8-disulfonic acid are diazotized analogously to the directions in Example 2 for diazotizing the naphthylamine used there, and 10.7 parts of 3-methylaniline are added to the diazonium salt solution. The coupling reaction is carried out at pH 2 and a temperature of 15° to 20° C., and, after the reaction batch has been adjusted to pH 5, 43.8 parts of 2-(β-chloroethylsulfonyl)propionyl chloride are added over about three hours while a pH of 6 to 9 and a temperature of 10° to 20° C. are maintained. After the acylation reaction has ended, the batch is adjusted to pH 3.5 to 4 and clarified, and the azo compound of the invention is isolated by spray drying.

The azo compound of the invention, which written in the form of the free acid, has the formula

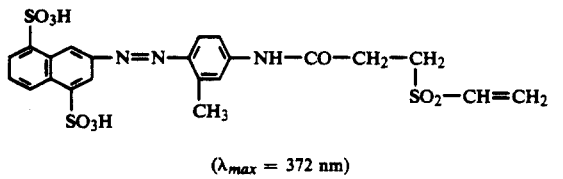

($\lambda_{max}$ = 372 nm)

has very good fiber-reactive dyestuff properties and applied by the dyeing methods customary in the industry for fiber-reactive dyes produces strong yellow prints having good fastness properties, of which in particular the light, wash, chlorine, perspiration, wet light and perspiration light fastness properties can be singled out. The azo compound of the invention has good buildup properties. The prints obtainable therewith have a clear white ground, and unfixed portions of the compound are readily washed off. Resist-impregnated parts of fabric are not stained by the azo compound of the invention, so that it is very highly suitable for preparing bright, crisp patterns in resist printing. Moreover, dyeings with the dye are dischargeable to white with the discharging agents customary in the industry.

EXAMPLE 4

An azo compound according to the invention is prepared analogously to the procedure of Example 2 by diazotizing 38.3 parts of 2-aminonaphthalene-4,6,8-trisulfonic acid, coupling the resulting diazonium salt with 14.5 parts of N-methylaniline and acylating the resulting aminoazo compound with 32 parts of 3-(β-chloroethylsulfonyl)benzoyl chloride. The novel azo compound obtained is isolated in a conventional manner. Written in the form of the free acid it has the structure of the formula

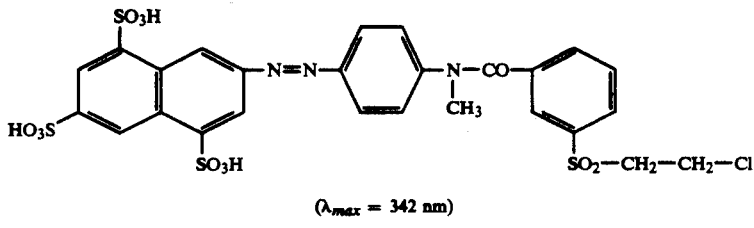

($\lambda_{max}$ = 342 nm)

and it produces on the materials mentioned in the description, in particular on cellulose fiber materials, for example cotton, strong yellow dyeings and prints having good fastness properties, of which in particular the light, wash, chlorine, perspiration, wet light and perspiration light fastness properties can be singled out. The azo compound of the invention has good buildup properties. The prints obtainable therewith have a clear white ground, and unfixed portions of the compound are readily washed off. Resist-impregnated parts of fabric are not stained by the azo compound of the invention, so that it is very highly suitable for preparing bright, crisp patterns in resist printing. Moreover, dyeings with the dye are dischargeable to white with the discharging agents customary in the industry.

EXAMPLES 5 TO 68

The Table Examples which follow describe further novel azo compounds in terms of the components indicated in the general formula (1A)

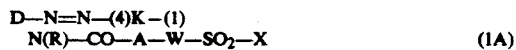

D—N=N—(4)K—(1)
N(R)—CO—A—W—SO$_2$—X        (1A)

These azo compounds can be prepared in a manner according to the invention, for example analogously to one of the above Examples, from the components evident from the particular Table Example in conjunction with the formula (1A) i.e. the diazo component D—NH$_2$, the coupling component H—K—N(R)H and the acid halide conforming to the general formula (3). They have very good fiber-reactive dyestuff properties and, applied and fixed by the application and fixing methods customary for fiber-reactive dyes, produce on the materials mentioned in the description, in particular on cellulose fiber materials, strong fast dyeings and prints in the hue indicated in the particular Table Example for dyeings on cotton. They are also very useful for both resist and discharge printing.

| | | Azo compound of the formula (1) | | | | |
|---|---|---|---|---|---|---|
| Ex. | Radical D | Radical —K—N(R)— | Radical A | Radical W | Radical X | Hue |
| 5 | 2,5-difulfophenyl | 8-sulfonaphth-1,4-ylen-1-amino | para-phenylene | methylene | β-chloroethyl | yellow |
| 6 | 2,4-disulfophenyl | 8-sulfonaphth-1,4-ylen-1-amino | para-phenylene | N-methylamino | β-chloroethyl | yellow |
| 7 | 2,4-disulfophenyl | 8-sulfonaphth-1,4-ylen-1-amino | para-phenylene | N-methylamino | vinyl | yellow |
| 8 | 4,8-disulfo-naphth-2-yl | 3-methylphen-1,4-ylen-1-amino | meta-phenylene | direct bond | vinyl | yellow (372) |

-continued

| | | Azo compound of the formula (1) | | | |
|---|---|---|---|---|---|
| Ex. | Radical D | Radical —K—N(R)— | Radical A | Radical W | Radical X | Hue |
| 9 | 4,8-disulfo-naphth-2-yl | 3-methylphen-1,4-ylen-1-amino | meta-phenylene | direct bond | β-chloroethyl | yellow |
| 10 | 4,8-disulfo-naphth-2-yl | 3-methylphen-1,4-ylen-1-amino | para-phenylene | methylene | β-chloroethyl | yellow |
| 11 | 4,8-disulfo-naphth-2-yl | 3-methylphen-1,4-ylen-1-amino | para-phenylene | N-methylamino | β-chloroethyl | yellow |
| 12 | 4,8-disulfo-naphth-2-yl | 3-methylphen-1,4-ylen-1-amino | 1,2-ethylene | direct bond | β-chloroethyl | yellow |
| 13 | 4,8-disulfo-naphth-2-yl | 3-methylphen-1,4-ylen-1-amino | 1,3-propylene | direct bond | vinyl | yellow |
| 14 | 2,4-disulfo-naphth-1-yl | 8-sulfonaphth-1,4-ylen-1-amino | meta-phenylene | direct bond | β-chloroethyl | yellow (376) |
| 15 | 2,4,7-trisulfo-naphth-1-yl | 8-sulfonaphth-1,4-ylen-1-amino | meta-phenylene | direct bond | β-chloroethyl | yellow |
| 16 | 2,5,7-trisulfo-naphth-1-yl | 8-sulfonaphth-1,4-ylen-1-amino | meta-phenylene | direct bond | β-chloroethyl | yellow (386) |
| 17 | 2,5,7-trisulfo-naphth-1-yl | 3-ureidophen-1,4-ylen-1-amino | meta-phenylene | direct bond | β-chloroethyl | yellow |
| 18 | 3,6-disulfo-naphth-1-yl | 8-sulfonaphth-1,4-ylen-1-amino | meta-phenylene | direct bond | β-chloroethyl | yellow |
| 19 | 4,8-disulfo-naphth-2-yl | 2,5-dimethylphen-1,4-ylen-1-amino | meta-phenylene | direct bond | β-chloroethyl | yellow (378) |
| 20 | 4,8-disulfo-naphth-2-yl | 2-methoxy-5-methyl-phen-1,4-ylen-1-amino | meta-phenylene | direct bond | β-chloroethyl | yellow (388) |
| 21 | 4,8-disulfo-naphth-2-yl | 3-acetylamino-phen-1,4-ylen-1-amino | meta-phenylene | direct bond | β-chloroethyl | yellow |
| 22 | 4,8-disulfo-naphth-2-yl | 3-ureidophen-1,4-ylen-1-amino | meta-phenylene | direct bond | β-chloroethyl | yellow (396) |
| 23 | 4,8-disulfo-naphth-2-yl | 3-ureidophen-1,4-ylen-1-amino | para-phenylene | methylene | β-chloroethyl | yellow |
| 24 | 4,8-disulfo-naphth-2-yl | 3-ureidophen-1,4-ylen-1-amino | para-phenylene | N-methylamino | β-chloroethyl | yellow |
| 25 | 4,8-disulfo-naphth-2-yl | 3-ureidophen-1,4-ylen-1-amino | 1,2-ethylene | direct bond | vinyl | yellow (396) |
| 26 | 4,8-disulfo-naphth-2-yl | 3-ureidophen-1,4-ylen-1-amino | 1,3-propylene | direct bond | vinyl | yellow |
| 27 | 4,8-disulfo-naphth-2-yl | 8-sulfonaphth-1,4-ylen-1-amino | meta-phenylene | direct bond | β-chloroethyl | yellow |
| 28 | 4,8-disulfo-naphth-2-yl | 8-sulfonaphth-1,4-ylen-1-amino | para-phenylene | methylene | β-chloroethyl | yellow |
| 29 | 4,8-disulfo-naphth-2-yl | 8-sulfonaphth-1,4-ylen-1-amino | 1,3-propylene | direct bond | vinyl | yellow (398) |
| 30 | 3,6,8-trisulfo-naphth-2-yl | 8-sulfonaphth-1,4-ylen-1-amino | meta-phenylene | direct bond | vinyl | yellow (399) |
| 31 | 3,6,8-trisulfo-naphth-2-yl | 8-sulfonaphth-1,4-ylen-1-amino | meta-phenylene | direct bond | β-chloroethyl | yellow |
| 32 | 3,6,8-trisulfo-naphth-2-yl | naphth-1,4-ylen-1-amino | meta-phenylene | direct bond | β-chloroethyl | yellow |
| 33 | 3,6,8-trisulfo-naphth-2-yl | 3-methylphen-1,4-ylen-1-amino | meta-phenylene | direct bond | β-chloroethyl | yellow |
| 34 | 3,6,8-trisulfo-naphth-2-yl | 2-methoxy-5-methyl-phen-1,4-ylen-1-amino | meta-phenylene | direct bond | β-chloroethyl | yellow |
| 35 | 3,6,8-trisulfo-naphth-2-yl | 2,5-dimethoxyphen-1,4-ylen-1-amino | meta-phenylene | direct bond | β-chloroethyl | yellow |
| 36 | 3,6,8-trisulfo-naphth-2-yl | 2-ureidophen-1,4-ylen-1-amino | meta-phenylene | direct bond | β-chloroethyl | yellow (399) |
| 37 | 3,6,8-trisulfo-naphth-2-yl | 3-acetylaminophen-1,4-ylen-1-amino | meta-phenylene | direct bond | β-chloroethyl | yellow |
| 38 | 3,6,8-trisulfo-naphth-2-yl | 2,5-dimethylphen-1,4-ylen-1-amino | meta-phenylene | direct bond | β-chloroethyl | yellow |
| 39 | 3,6,8-trisulfo-naphth-2-yl | 2,5-dimethylphen-1,4-ylen-1-amino | para-phenylene | methylene | β-chloroethyl | yellow |
| 40 | 3,6,8-trisulfo-naphth-2-yl | 2,5-dimethylphen-1,4-ylen-1-amino | para-phenylene | M-methylamino | β-chloroethyl | yellow |
| 41 | 3,6,8-trisulfo-naphth-2-yl | 2,5-dimethylphen-1,4-ylen-1-amino | 1,2-ethylene | direct bond | vinyl | yellow |
| 42 | 3,6,8-trisulfo-naphth-2-yl | 3-amidocarbonyl-phen-1,4-ylen-1-amino | 1,3-propylene | direct bond | vinyl | yellow |
| 43 | 4,6,8-trisulfo-naphth-2-yl | 3-amidocarbonyl-phen-1,4-ylen-1-amino | meta-phenylene | direct bond | β-chloroethyl | yellow |
| 44 | 4,6,8-trisulfo-naphth-2-yl | 2-methoxy-5-methyl-phen-1,4-ylen-1-amino | meta-phenylene | direct bond | β-chloroethyl | yellow (388) |
| 45 | 4,6,8-trisulfo-naphth-2-yl | 2-methoxy-5-methyl-phen-1,4-ylen- | para-phenylene | methylene | β-chloroethyl | yellow |

-continued

| Ex. | Radical D | Radical —K—N(R)— | Radical A | Radical W | Radical X | Hue |
|---|---|---|---|---|---|---|
| 46 | 4,6,8-trisulfo-naphth-2-yl | 1-amino-8-sulfonaphth-1,4-ylen-1-amino | para-phenylene | methylene | β-chloroethyl | yellow |
| 47 | 4,6,8-trisulfo-naphth-2-yl | 8-sulfonaphth-1,4-ylen-1-amino | meta-phenylene | direct bond | β-chloroethyl | yellow (398) |
| 48 | 4,6,8-trisulfo-naphth-2-yl | 6-sulfonaphth-1,4-ylen-1-amino | meta-phenylene | direct bond | β-chloroethyl | yellow |
| 49 | 4,6,8-trisulfo-naphth-2-yl | 7-sulfonaphth-1,4-ylen-1-amino | meta-phenylene | direct bond | β-chloroethyl | yellow |
| 50 | 4,6,8-trisulfo-naphth-2-yl | naphth-1,4-ylen-1-amino | meta-phenylene | direct bond | β-chloroethyl | yellow |
| 51 | 4,6,8-trisulfo-naphth-2-yl | 3-methylphen-1,4-ylen-1-amino | meta-phenylene | direct bond | β-chloroethyl | yellow (370) |
| 52 | 4,6,8-trisulfo-naphth-2-yl | 3-methylphen-1,4-ylen-1-amino | meta-phenylene | vinyl | | yellow |
| 53 | 4,6,8-trisulfo-naphth-2-yl | 3-methylphen-1,4-ylen-1-amino | para-phenylene | methylene | vinyl | yellow |
| 54 | 4,6,8-trisulfo-naphth-2-yl | 8-sulfonaphth-1,4-ylen-1-amino | para-phenylene | methylene | vinyl | yellow |
| 55 | 4,6,8-trisulfo-naphth-2-yl | 8-sulfonaphth-1,4-ylen-1-amino | meta-phenylene | direct bond | vinyl | yellow |
| 56 | 4,6,8-trisulfo-naphth-2-yl | naphth-1,4-ylen-1-amino | meta-phenylene | direct bond | vinyl | yellow (395) |
| 57 | 1,5-disulfo-naphth-2-yl | 8-sulfonaphth-1,4-ylen-1-amino | meta-phenylene | direct bond | β-chloroethyl | yellow |
| 58 | 1,5-disulfo-naphth-2-yl | 6-sulfonaphth-1,4-ylen-1-amino | meta-phenylene | direct bond | β-chloroethyl | yellow |
| 59 | 3,6-disulfo-naphth-2-yl | 8-sulfonaphth-1,4-ylen-1-amino | meta-phenylene | direct bond | β-chloroethyl | yellow |
| 60 | 6,8-disulfo-naphth-2-yl | 8-sulfonaphth-1,4-ylen-1-amino | meta-phenylene | direct bond | β-chloroethyl | yellow |
| 61 | 2,5-disulfo-4-methoxyphenyl | 3-ureidophen-1,4-ylen-1-amino | meta-phenylene | direct bond | β-chloroethyl | yellow |
| 62 | 2-sulfo-4-methoxyphenyl | 3-ureidophen-1,4-ylen-1-amino | meta-phenylene | direct bond | β-chloroethyl | yellow (376) |
| 63 | 2,5-dimethoxy-4-sulfophenyl | 3-ureidophen-1,4-ylen-1-amino | meta-phenylene | direct bond | β-chloroethyl | yellow |
| 64 | 4,8-disulfo-naphth-2-yl | 2-methoxy-6-sulfo-naphth-1,4-ylen-1-amino | meta-phenylene | direct bond | β-chloroethyl | yellow (400) |
| 65 | 4,6,8-trisulfo-naphth-2-yl | 2-methoxy-6-sulfo-naphth-1,4-ylen-1-amino | meta-phenylene | direct bond | β-chloroethyl | yellow |
| 66 | 3,6,8-trisulfo-naphth-2-yl | 2-methoxy-6-sulfo-naphth-1,4-ylen-1-amino | meta-phenylene | direct bond | β-chloroethyl | yellow |
| 67 | 3,6,8-trisulfo-naphth-2-yl | 2-methoxy-6-sulfo-naphth-1,4-ylen- | meta-phenylene | direct bond | β-chloroethyl | yellow |
| 68 | 2,5-disulfophenyl | 8-sulfonaphth-1,4-ylen-1-amino | para-phenylene | methylene | vinyl | yellow |
| 69 | 4,6,8-trisulfo-naphth-2-yl | 3-amidocarbonyl-phen-1,4-ylen-1-amino | meta-phenylene | direct bond | β-chloroethyl | yellow (379) |
| 70 | 2,4-disulfo-naphth-1-yl | 3-ureidophen-1,4-ylen-1-amino | meta-phenylene | direct bond | β-chloroethyl | yellow (322) |

What is claimed is:

1. A monoazo compound conforming to the formula (1)

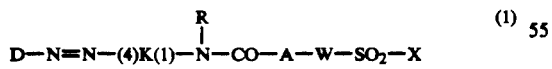

wherein:
D is monosulfophenyl or disulfophenyl, each unsubstituted or substituted by 1 or 2 substituents selected from the group consisting of alkyl of 1 to 4 carbon atoms, alkoxy of 1 to 4 carbon atoms, halogen, carboxy and alkanoylamino of 2 to 5 carbon atoms, or is mono-, di- or trisulfonaphthyl;

K is para-phenylene unsubstituted or substituted by 1 or 2 substituents selected from the group consisting of alkyl of 1 to 4 carbon atoms, alkoxy of 1 to 4 carbon atoms, halogen, alkanoylamino of 2 to 5 carbon atoms, ureido, carbamoyl and sulfo, or is 1,4-naphthylene unsubstituted or substituted by substituents selected from 1 or 2 sulfo groups and 1 alkoxy group of 1 to 4 carbon atoms;

R is hydrogen or alkyl of 1 to 4 carbon atoms;

A is phenylene or a direct bond;

W is different from A and is a direct bond or an alkylene of 1 to 4 carbon atoms; provided, that either A or W is a direct bond;

X is vinyl or is ethyl substituted in the β-position by a substituent eliminable by alkali to form the vinyl group.

2. A monoazo compound as claimed in claim 1, wherein D is monosulfo- or disulfo-naphthy-2-yl.

3. A monoazo compound as claimed in claim 1, wherein the radical —(4)K(1)—N(R)— is 3-ureidophen-1,4-ylen-1-amino.

4. A monoazo compound as claimed in claim 1, wherein the radical —(4)K(1)—N(R)— is a monosulfo-substituted naphth-1,4-ylen-1-amino radical.

5. A monoazo compound as claimed in claim 1, wherein A is 1,3-phenylene.

6. A monoazo compound as claimed in claim 1, wherein X is vinyl, β-sulfatoethyl or β-chloroethyl.

7. A monoazo compound as claimed in claim 1, wherein X is β-chloroethyl.

* * * * *